United States Patent
Li et al.

(10) Patent No.: US 11,030,013 B2
(45) Date of Patent: Jun. 8, 2021

(54) SYSTEMS AND METHODS FOR SPLITTING PROCESSING BETWEEN DEVICE RESOURCES AND CLOUD RESOURCES

(71) Applicant: Verizon Patent and Licensing Inc., Basking Ridge, NJ (US)

(72) Inventors: Yuk Lun Li, Morganville, NJ (US); Antoinette Donofrio, Whitehouse Station, NJ (US); Neil S. Mehta, East Hanover, NJ (US); Yuexin Dong, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 16/160,550

(22) Filed: Oct. 15, 2018

(65) Prior Publication Data

US 2020/0117513 A1    Apr. 16, 2020

(51) Int. Cl.
*G06F 9/50* (2006.01)
*G06F 9/48* (2006.01)

(52) U.S. Cl.
CPC .............. *G06F 9/5044* (2013.01); *G06F 9/48* (2013.01); *G06F 9/4806* (2013.01);
(Continued)

(58) Field of Classification Search
CPC ............... G06F 9/5044; G06F 9/505; G06F 9/48–9/4893; G06F 9/50–9/5094; G06F 9/4806; G06F 9/4843; G06F 9/4881; G06F 9/5005; G06F 9/5022; G06F 9/5027; G06F 9/5055; G06F 9/5061; G06F 9/5083; G06F 2009/503
See application file for complete search history.

(56) References Cited

U.S. PATENT DOCUMENTS

2002/0068600 A1* 6/2002 Chihara ................ H04M 1/576
455/557
2005/0273456 A1* 12/2005 Revanuru ........... H04L 67/1029
(Continued)

OTHER PUBLICATIONS

Deyannis et al, "Enabling GPU-assisted Antivirus Protection on Android Devices through Edge Offloading", EdgeSys' 18, Jun. 10-15, 2018, Munich, Germany, ACM, pp. 13-18. (Year: 2018).*
(Continued)

*Primary Examiner* — Charles M Swift

(57) ABSTRACT

An example described herein includes a device to receive, from a user device, a request message to split processing, of an application, between the user device and the server device; determine a processing capability of the server device; and determine whether the server device is capable of executing a process of the application based on the processing capability of the server device. When the server device is determined to be capable of executing the process of the application, the device may: send an acceptance message to the user device, wherein the acceptance message identifies a first set of processes of the application and includes instructions to permit the user device to execute the first set of processes; and execute a second set of processes of the application, wherein the user device executes the first set of processes of the application substantially simultaneously as the server device executes the second set of processes of the application.

20 Claims, 6 Drawing Sheets

(52) U.S. Cl.
CPC .......... G06F 9/4843 (2013.01); G06F 9/4881 (2013.01); G06F 9/50 (2013.01); G06F 9/5005 (2013.01); G06F 9/5022 (2013.01); G06F 9/5027 (2013.01); G06F 9/5055 (2013.01); G06F 9/5061 (2013.01); G06F 9/5083 (2013.01); G06F 9/505 (2013.01); G06F 9/5094 (2013.01); G06F 2209/503 (2013.01)

(56) References Cited

U.S. PATENT DOCUMENTS

| | | | | |
|---|---|---|---|---|
| 2011/0154350 | A1* | 6/2011 | Doyle | G06F 9/5044 718/104 |
| 2014/0095695 | A1* | 4/2014 | Wang | G06F 9/5088 709/224 |
| 2014/0143785 | A1* | 5/2014 | Mistry | G06F 9/5044 718/104 |
| 2014/0280509 | A1* | 9/2014 | Merrells | H04L 67/40 709/203 |
| 2014/0317301 | A1* | 10/2014 | Kiet | H04L 67/141 709/227 |
| 2015/0143364 | A1* | 5/2015 | Anderson | G06F 9/5088 718/1 |
| 2016/0292009 | A1* | 10/2016 | Kaplan | G06F 9/5027 |
| 2018/0287863 | A1* | 10/2018 | Finger | H04L 41/082 |
| 2019/0380074 | A1* | 12/2019 | Lu | H04W 36/023 |

OTHER PUBLICATIONS

Trinh et al, "Energy-aware Mobile Edge Computing for Low-Latency Visual Data Processing", 2017 IEEE 5th International Conference on Future Internet of Things and Cloud, pp. 128-133 (Year: 2017).*

* cited by examiner

SYSTEMS AND METHODS FOR SPLITTING PROCESSING BETWEEN DEVICE RESOURCES AND CLOUD RESOURCES

BACKGROUND

In a multi-access edge compute (MEC) environment, computing is enabled by a network architecture that provides computing capabilities, to a user device, via computing platforms at or near an edge of a network (e.g., a cellular network). Accordingly, because a MEC environment can provide computing at or near the edge of the network, increased performance may be achieved over network architectures that provide computing from the core of the network, which may be topologically and/or physically further than a MEC environment. Such increased performance may be achieved in the MEC environment due to less traffic and/or congestion between a user device and the computing platform, less latency (due to the closer proximity), increased flexibility (due to a greater amount of computing platforms), and/or the like over other network architectures.

DETAILED DESCRIPTION OF PREFERRED EMBODIMENTS

Figure 1A:
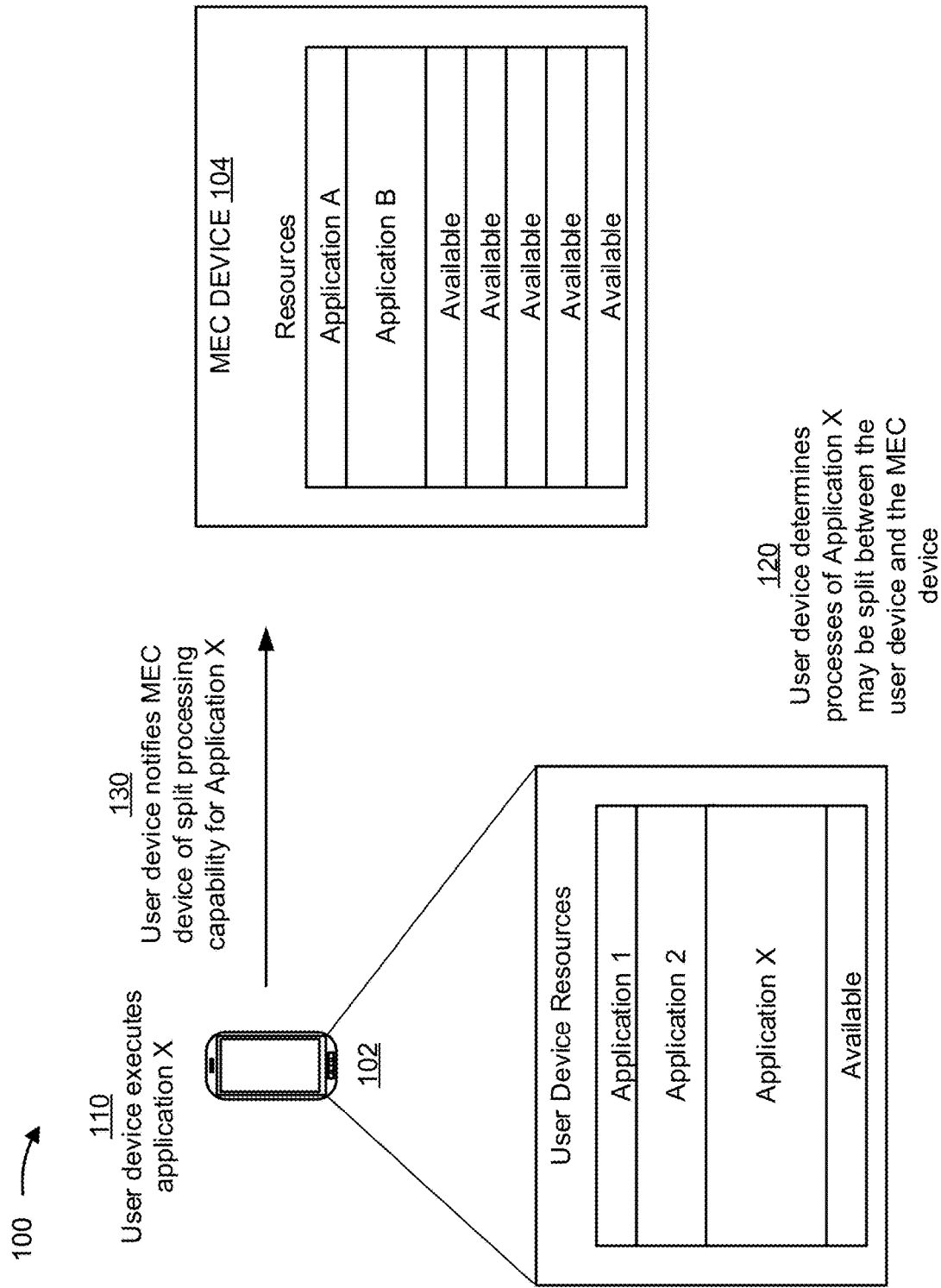
FIGS. 1A and 1B are a diagrams of an example implementation described herein.

The following detailed description of example implementations refers to the accompanying drawings. The same reference numbers in different drawings may identify the same or similar elements.

In some instances, an application may utilize both resources of a user device and resources of a cloud environment (e.g., resources of a server device in the cloud environment) while the application is running. Examples of such an application may include augmented reality applications, virtual reality applications, image processing applications (e.g., which include mapping, security, and/or the like), autonomous vehicle control applications (e.g., which include high definition (HD) mapping, safety infrastructure, and/or the like), and/or the like. In some cases, most or all of the processing of the application may be offloaded to the cloud environment because the user device may not have the processing resources (e.g., processing power and/or memory resources) to perform the processing and the user device may simply display information provided from the cloud environment. In other cases, the processing may be split between the user device and the cloud environment according to a pre-configured distribution of processes of the application as defined by a configuration of the application.

In some instances, an allocation of the processing of the application between the user device and a cloud environment (e.g., a MEC environment) may use a performance capability of a particular user device (e.g., a user device that has a relatively low or the lowest performance capability of all types of user devices that support the application) to determine how the processing of the application is to be split. In such cases, the processes of the application may be distributed to any or all user devices running the application and the cloud environment according to the performance capability of that particular user device. However, a user device that has a higher performance capability than the lowest performance capability may waste the performance capability of the user device and, correspondingly, waste/occupy cloud environment resources that are used on processing for the user device. Furthermore, the allocation may be pre-configured, and thus does not consider real-time characteristics of the user device and/or cloud environment when allocating the processes of the application between the user device and the cloud environment.

According to some implementations described herein, a split processing platform of a cloud environment (e.g., a MEC environment) may enable a dynamic allocation of processes of an application to be split between a user device and a server device of the cloud environment (e.g., a MEC device of the MEC environment) based on one or more characteristics associated with the user device, one or more characteristics associated with the server device (or cloud environment), one or more characteristics of a communication link between the user device and the server device, and/or one or more characteristics of the application (or processes of the application). Accordingly, while the application is running on the user device and the server device, the user device and/or the server device may, in real-time, adjust which processes of the application that the user device and the server device are to respectively execute. Furthermore, in some implementations, a priority may be given to certain user devices over other user devices based on a subscription status of the user devices. For example, a server device may provide more computing resources for a user device associated with a premium subscription than for a user device associated with a standard or basic subscription. As such, the split processing platform described herein may distribute processes of an application between a user device and a server device according to individual characteristics of the user device.

Therefore, some implementations described herein may enable computing resources of a user device and/or a server device to be conserved based on the characteristics of the user device and/or server device. For example, the user device may offload a set of processes of an application to the server device to permit the user device to conserve computing resources (e.g., processing resources, memory resources, and/or the like), power resources (e.g., a battery level), and/or the like. Additionally, or alternatively, the server device may instruct the user device to execute a set of processes of the application to permit the server device to conserve computing resources that may be used to execute processes of other applications for other user devices that may need the server device to help conserve the resources of the other user devices. Furthermore, network resources may be conserved by instructing or causing the user device to execute processes of the application (e.g., because data associated with processes executed by the server device may not need to be transmitted over the network).

Figure 1B:
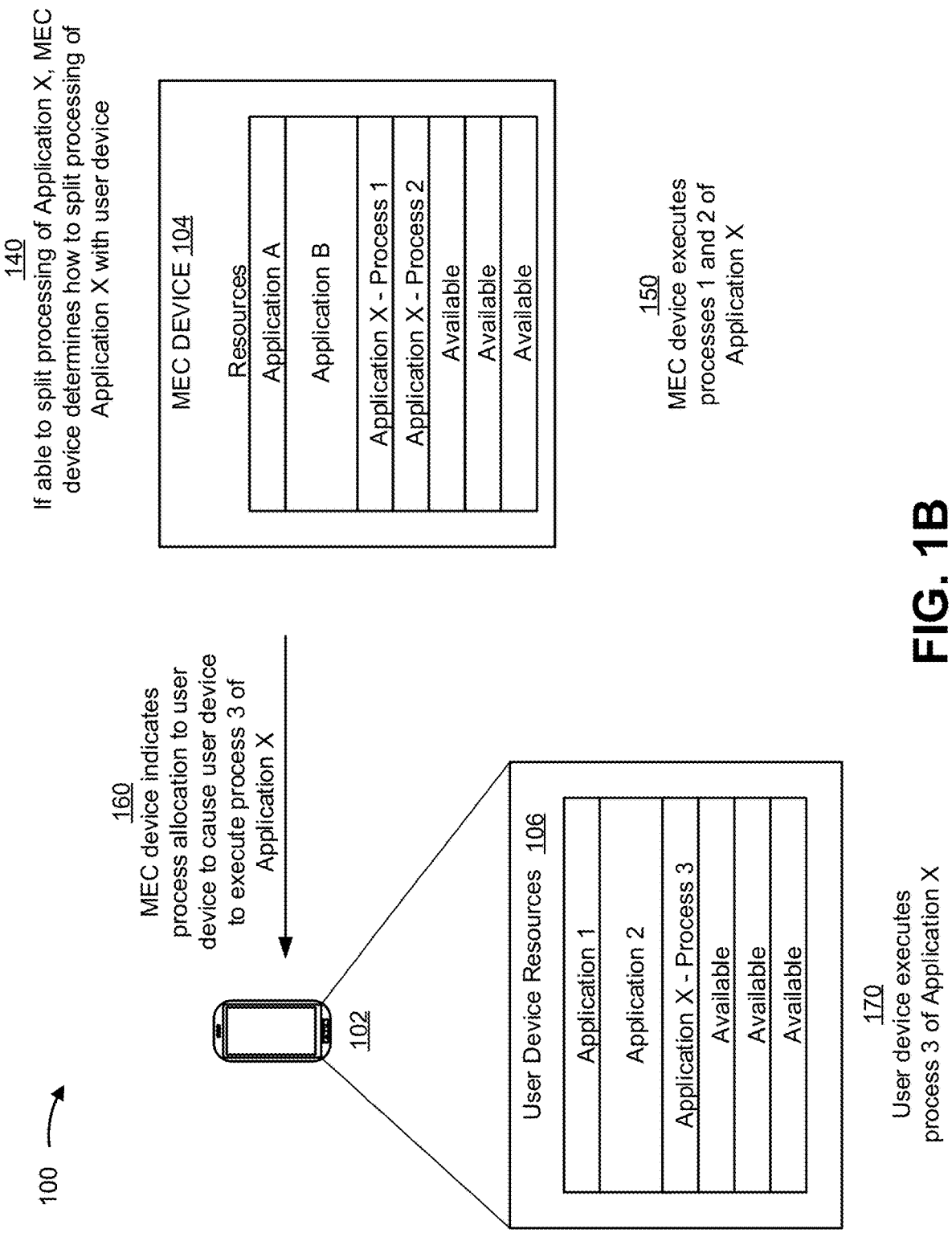

FIGS. 1A and 1B are diagrams of an example implementation 100 described herein. Example implementation 100 includes a user device 102 and a MEC device 104 in a cloud environment (e.g. an MEC environment). The user device 102 may be communicatively coupled with the MEC device 104 via a network and/or network device (e.g., via a base station of a network of associated with the cloud environment and/or MEC device). As described herein, processes of an application (shown as Application X) may be split between the user device 102 and the MEC device 104 according to one or more characteristics of the user device 102, one or more characteristics of the MEC device 104, one or more characteristics of a communication link between the user device 102 and the MEC device 104, one or more characteristics of a network of the user device 102 and the MEC device 104, and/or one or more characteristics of the application.

As shown in FIG. 1A, and by reference number 110, the user device 102 executes application X. As shown, upon execution, application X uses resources of the user device 102. In some implementations, upon execution, application X may use one or more resources of the MEC device 104. As shown in the example of FIG. 1A, most of the resources of the user device 102 are in use by application 1, application 2, and application X.

As further shown in FIG. 1A, and by reference number 120, after executing application X, the user device 102 may determine that processes of application X may be split between the user device 102 and the MEC device 104. For example, the user device 102 may determine that processes of application X may be split based on a characteristic of application X. Such characteristics may include a type of application X, an indicator denoting split processing capability, metadata of application X, code of application X, and/or the like.

In some implementations, the user device 102 may determine which processes of application X are to be executed by the user device 102 and which processes are to be executed by the MEC device 104. The user device 102 may determine which processes are to be executed by the user device 102 and/or the MEC device 104 based on one or characteristics of the processes of applications X (e.g., latency requirements, processing requirements, and/or the like). For example, the user device 102 may determine that processes requiring relatively more processing power are to be executed by the MEC device 104, that processes requiring relatively lower latency are to be processed by the user device 102, and/or the like. Accordingly, the user device 102 may notify the MEC device 104 of split processing and/or request that split processing of application X be performed based on the characteristics of the processes of application X.

As further shown in FIG. 1A, and by reference number 130, the user device 102 notifies the MEC device 104 of split processing capability for application X. For example, based on the user device 102 determining that processing of the application X may be split between the user device 102 and the MEC device 104, the user device 102 may send a notification to the MEC device 104 that processes of application X can be split between the user device 102 and the MEC device 104. Additionally, or alternatively, if the user device 102 determines that processes of application X are to be offloaded to the MEC device 104 (e.g., to conserve resources of the user device 102, to conserve power of the user device 102, and/or the like), the user device 102 may send a request message to split processing of application X based on one or more characteristics of the user device 102. Such characteristics may include an amount of available resources of the user device 102, a battery level of the user device 102, a processing power of the user device 102, and/or the like. Furthermore, in some implementations, the user device 102 may indicate (e.g., via the notification and/or the request message) that application X is installed on the user device 102. Accordingly, application X may correspondingly be installed on both the user device 102 and the MEC device 104.

In some implementations, the user device 102 may notify the MEC device 104 of the split processing capability for application X when notifying the MEC device 104 that application X has been executed. For example, once the user device 102 launches application X, the user device 102 may send the notification that user device is to use resources of MEC device to run application X. In such cases, the user device 102 may include, within the notification, information associated with the user device 102. Such information may include an identifier of the user device 102, a model of the user device 102, a type of the user device 102, a subscription associated with the user device 102 (e.g., a subscription associated with application X and/or a subscription associated with services provided by the cloud environment of the MEC device 104), a workload of the user device 102 (e.g., an amount of resources in use, an amount of applications running, and/or the like), a quality of a communication link between the user device 102 and the MEC device 104 (e.g., a packet loss rate, a bit rate, a signal to noise ratio, a signal to interference ratio, a signal to interference plus noise ratio, and/or the like), a battery level of the user device 102 (or an estimated amount of remaining battery life), a power consumption rate of the user device 102, and/or the like. Accordingly, the MEC device 104 may use the request message and/or the notification to determine whether to authorize split processing of application X between the user device 102 and the MEC device 104.

As shown in FIG. 1B, and by reference number 140, if able to split the process of application X, the MEC device 104 determines how to split the processing of application X with the user device 102. The MEC device 104 may determine how to split the processing of the application based on processing capabilities of the user device 102, based on processing capabilities of the MEC device 105, based on the communication link between the user device 102 and the MEC device 104, and/or the like.

The MEC device 104 may determine the processing capability and/or one or more characteristics of the user device 102 to determine how the processes of application X are to be split. For example, the MEC device 104 may determine the processing capability of the user device 102 based on an identifier for the user device 102 (e.g., an international mobile equipment identity (IMEI)), a model of the user device 102, a type of the user device 102, and/or the like. In such cases, the MEC device 104 may use a mapping of user devices that includes IMEIs associated with a network of the MEC device 104, models of the user devices, types of the user devices, and/or the like to respective processing capabilities of the user devices. Accordingly, the MEC device 104 may use the mapping to identify the processing capability of the user device 102 of example implementation 100.

Additionally, or alternatively, the MEC device 104 may determine one or more operating characteristics of the user device 102 (e.g., based on information received from the user device 102). For example, the user device 102 may indicate a workload of the user device 102 (which may indicate an amount of available resources of the user device 102, resources of the user device 102 that are under consumption, and/or other applications or processes executing on the user device 102), a battery level of the user device 102, and/or a power consumption rate of the user device 102. Accordingly, the MEC device 104 may determine that the MEC device 104 is to execute relatively more processes of application X when the user device 102 has relatively fewer available resources (e.g., due to the workload of the user device 102), a lower battery level (e.g., to conserve remaining power in the battery), and/or a faster power consumption rate (e.g., to conserve the remaining power). On the other hand, the MEC device 104 may determine that the MEC device 104 is to execute fewer processes of application X when the user device 102 has relatively more available resources (e.g., to conserve resources of the MEC device 104), processing power, and/or a high battery level or a slower power consumption rate (e.g., because the user device 102 has enough power to execute the processes).

Additionally, or alternatively, the MEC device 104 may determine whether split processing can and/or should be performed to execute application X according to one or more operating characteristics of the MEC device 104 (and/or a MEC environment of the MEC device 104). For example, if the MEC device 104 has available resources to perform split processing, the MEC device 104 may determine that split processing of application X can be performed with the user device 102. Accordingly, the MEC device 104 may determine whether to enable split processing of application X based on a workload of the MEC device 104, an amount of available processing power of the MEC device 104, an amount of available memory of the MEC device 104, and/or the like in addition to, or alternative to, the characteristics of the user device 102.

In some implementations, the MEC device 104 may consider corresponding characteristics of other MEC devices in communication with the user device 102 to determine whether one or more of the other MEC devices (e.g., other MEC devices of a same MEC environment of the MEC device 104) can perform split processing with the user device 102. In such cases, the MEC device 104 may further consider characteristics of potential communication links between the user device 102 and the other MEC devices. For example, such characteristics of the potential communication links may include any added latency (e.g., due to distance between the other MEC devices and the user device 102), quality of the communication links, and/or the like.

According to some implementations, the MEC device 104 may consider a service agreement between the user device 102 and a network of the MEC device 104. For example, the MEC device 104 may identify whether the user device 102 is a subscriber of the network and/or has a particular subscription status (e.g., a premium subscription that would entitle the user device 102 to relatively more resources than a standard or basic subscription). For example, if the user device 102 is not associated with a network of the MEC device 104, the MEC device 104 may not enable split processing of application X. However, if the user device 102 is a subscriber of the network, the MEC device 104 may authorize split processing based on the subscription status associated with the user device 102. For example, the MEC device 104 may execute relatively more processes of application X if the user device 102 is associated with a premium subscription and relatively fewer or zero processes of application X if the user device 102 is associated with a standard or basic subscription. Additionally, or alternatively, the MEC device 104 may consider whether there is a service requirement associated with application X. For example, the MEC device 104 may be configured to enable split processing based on a requirement specific to application X (e.g., based on an agreement between an entity associated with application X and an entity associated with the MEC device 104). Accordingly, the MEC device 104 may authorize split processing of application X with the user device 102 based on a service requirement for application X.

In some implementations, the MEC device 104 may determine one or more characteristics of a communication link between the user device 102 and the MEC device 104. For example, the MEC device 104 may determine a quality of the communication link based on a packet loss rate, a bit rate, a signal to noise ratio, a signal to interference ratio, a signal to interference plus noise ratio, and/or the like of the communication link. Such information may be provided by the user device 102 (e.g., in a notification of split processing capability, in a notification and/or a request for split processing between the user device 102 and the MEC device 104, and/or the like). The MEC device 104 may determine that the MEC device 104 can execute relatively more processes of application X when the quality of the communication link is relatively stronger because relatively higher amounts of data can be exchanged over the communication link when the communication link is strong. On the other hand, the MEC device 104 may execute fewer processes of application X when the communication link is weak so that data associated with the processes executed by the MEC device 104 is not lost or dropped.

Additionally, or alternatively, the MEC device 104 may determine one or more characteristics of the application and/or processes of the application. For example, the MEC device 104 may identify one or more constraints or priorities of processes 1-3 of application X (e.g., processing requirements, latency requirements, packet error rate requirements, and/or the like). The MEC device 104 may decide to split processes 1-3 based on the characteristics. For example, any of processes 1-3 that require relatively lower latency may be executed by the user device 102 (e.g., to minimize latency) and any of processes 1-3 that require relatively more processing resources may be executed by the MEC device 104 (e.g., to conserve the user device resources). Additionally, or alternatively, the MEC device 104 may determine that any of processes 1-3 that require relatively higher amounts of processing power are to be executed by the MEC device 104 (because the MEC device 104 has greater amounts of processing power than the user device 102) and any of processes 1-3 that require relatively fewer amounts of processing power are to be executed by the user device 102 (because the user device 102 has less processing power than the MEC device 104).

In some implementations, the MEC device 104 may use a machine learning model to determine how to split processes between the user device 102 and the MEC device 104. For example, MEC device 104 may train the machine learning model based on one or more parameters (and threshold values of the one or more parameters) associated with splitting processes of an application for execution between a user device and a MEC device (or other server device), such as a processing capability of the user device 102, one or more characteristics associated with the user device 102, a processing capability of the MEC device 104, one or more parameters associated with the MEC device 104, one or more characteristics of a communication link between the user device 102 and the MEC device 104, one or more characteristics or constraints of processes of the application, and/or the like. The characteristics of the user device 102 may include an identifier of the user device 102, a model of the user device 102, a type of the user device 102, a subscription associated with the user device 102, a workload of the user device 102, a quality of a communication link between the user device 102 and the MEC device 104, a battery level of the user device 102, a power consumption rate of the user device 102, and/or the like. The characteristics of the MEC device 104 may include a loading of the MEC device 104, a service agreement between the user device 102 and the MEC device 104, a service requirement associated with the application, a number of devices in communication with the MEC device 104, an amount of available processing power of the MEC device 104, an amount of available memory of the MEC device 104, and/or the like. The one or more characteristics of the communication link may include a quality, a bit rate, a packet loss rate, a signal-to-noise ratio, a signal-to-interference ratio, a signal-to-noise plus interference ratio, and/or the like.

The MEC device 104 and/or any other device (e.g., a device associated with a MEC environment of the MEC device 104) may train the machine learning model using historical data associated with splitting processes of an application between the user device 102 and the MEC device 104 according to the one or more parameters. Using the historical data and the one or more parameters as inputs to the machine learning model, the machine learning model may determine a manner of splitting processes between the user device 102 and the MEC device 104 to execute the application and/or conserve computing resources of the user device 102, power resources of the user device 102, computing resources of the MEC device 104, and/or network resources of a network associated with the user device 102 and/or MEC device 104 that are associated with executing the application.

As shown, the MEC device 104 may determine, from the above, that the user device 102 is to execute process 3 of application X (which may be considered a first set of processes of application X) and the MEC device 104 is to execute processes 1 and 2 of application X (which may be considered a second set of processes of application X).

As further shown in FIG. 1B, and by reference number 150, the MEC device 104 executes processes 1 and 2 of application X. The MEC device 104 may be configured to execute processes 1 and 2 of application X in accordance with the user device 102 executing process 3 of application X. Therefore, during execution of processes 1 and 2, the MEC device 104 may communicate with the user device 102 to correspondingly execute process 3 according to process requirements and/or constraints of process 3. As such, the user device 102 and the MEC device 104 may act in tandem to execute application X (and/or cooperate to execute application X).

As further shown in FIG. 1B, and by reference number 160, the MEC device 104 indicates the process allocation to the user device 102 to cause the user device 102 to execute process 3 of application X. The MEC device 104 may provide instructions and/or execution details to the user device 102 to permit the user device 102 to execute process 3 of application X.

In some implementations, based on the MEC device 104 determining and/or indicating that split processing is to be performed to execute application X, the MEC device 104 and/or the user device 102 may establish a dedicated communication link for processing application X. In some implementations, the dedicated communication link may be adapted and/or reconfigured from the communication link used to receive the notification and/or request to perform split processing. In such cases, the communication link may be reconfigured to increase an amount of network resources (e.g., resource blocks of a channel) that the user device 102 and/or MEC device 104 may use to communicate and/or process information associated with executing the respective processes of application X.

As further shown in FIG. 1B, and by reference number 170, the user device 102 executes process 3 of application X. Accordingly, the user device 102 may execute process 3 and/or interact with the MEC device 104 during execution of processes 1-3 of application X to execute application X via split processing. As such, the MEC device 104 may execute processes 1-2 substantially simultaneously to user device 102 executing process 3, as necessary to execute application X.

Accordingly, the MEC device 104 may enable split processing between the user device 102 and the MEC device 104, as described herein. As such, the MEC device 104 (and/or user device 102) may conserve computing resources of the user device 102, power resources of the user device 102, computing resources of the MEC device 104, and/or network resources of a network of the user device 102 and/or MEC device by splitting processes for execution between the user device 102 and the MEC device 104 based on characteristics of the user device 102, the MEC device 104, the network, and/or the processes of the application.

As indicated above, FIGS. 1A and 1B are provided merely as an example. Other examples are possible and can differ from what was described with regard to FIGS. 1A and 1B. For example, in practice, there may be networks between the devices, additional devices, fewer devices, different devices, or differently arranged than those shown in FIGS. 1A and 1B.

Figure 2:
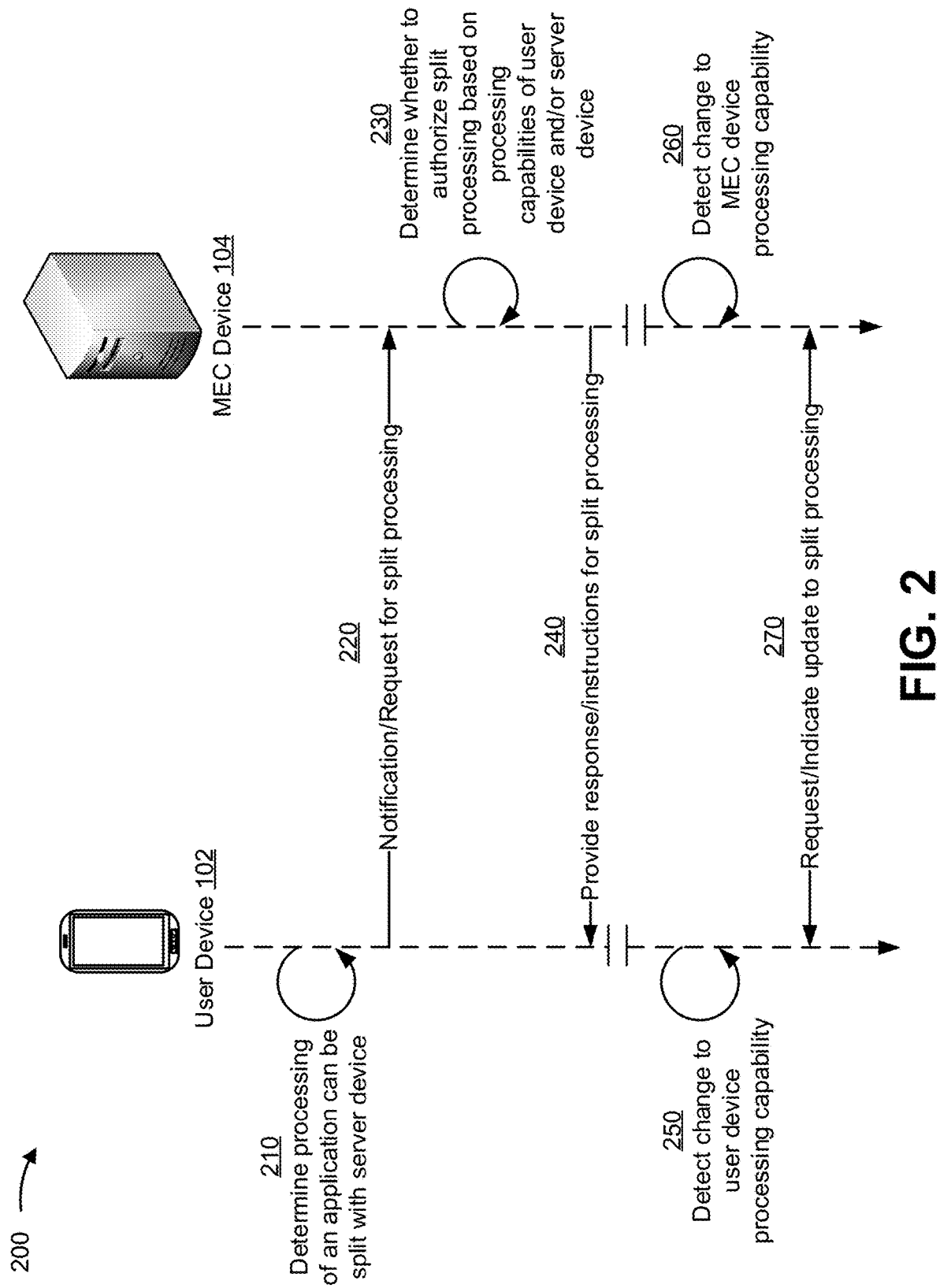
FIG. 2 is a call flow diagram of an example call flow between devices of an example implementation described herein.

FIG. 2 is a call flow diagram of an example call flow 200 between devices of an example implementation described herein. The call flow 200 of FIG. 2 is between a user device 102 and a MEC device 104. According to some implementations, the messages of the call flow may be iteratively sent and/or received by the user device 102 and/or the MEC device 104 (e.g., based on changes to the processing capability of the user device 102, changes to the processing capability of the MEC device 104, changes to the communication link(s) used to send and/or receive the messages, and/or the like).

As shown in FIG. 2, and by reference number 210, the user device 102 determines that processing of an application can be split with the MEC device 104. The user device 102 may determine that processing of the application can be split based on characteristics of the application and/or characteristics of the user device 102. As shown by reference number 220, the user device 102 may send a notification or request for split processing to the MEC device 104. In some implementations, the user device 102 may notify the MEC device 104 of the split processing capability in a notification that the application is being executed by the user device 102. In some implementations, a request may be sent to perform split processing. The notification and/or request may be sent in a same message or different messages.

As further shown in FIG. 2, and by reference number 230, the MEC device 104 determines whether to authorize split processing based on the processing capabilities of the user device 102 and/or the MEC device 104. Additionally, or alternatively, the MEC device 104 may consider a quality of the communication link between the user device 102 and the MEC device 104 and/or characteristics of the processes of the application when determining whether to authorize split processing based on the processing capabilities of the user device 102 and/or the MEC device 104.

As shown by reference number 240, the MEC device 104 provides instructions for the split processing. For example, if the MEC device 104 cannot perform split processing (e.g., due to the workload of the MEC device 104, a subscription associated with the user device 102, and/or the like), the MEC device 104 may indicate that split processing is not to be performed for the application. If the MEC device 104 determines that split processing can be performed, the MEC device 104 may indicate a mapping of the processes of the application denoting which processes are to be executed by which device. As such, the MEC device 104 may permit the user device 102 to execute one or more of the processes of the application while the MEC device 104 executes any remaining processes (or at least a set of remaining processes) of the application.

As further shown in FIG. 2, and by reference number 250, the user device 102 detects a change in the user device 102 processing capability. For example, one or more applications may be launched or closed on the user device 102, the user device 102 may enter a power save mode (e.g., due to a low battery level), the battery of the user device 102 may reach a threshold charge level, the processor may reach a threshold, and/or the like. Additionally, or alternatively, as shown by reference number 260, the MEC device 104 may detect a change to the MEC device processing capability. For example, the MEC device 104 may perform processing for one or more additional user devices and/or complete processing for one or other user devices, resulting in fewer available resources and/or processing power to execute process(es) of the application being executed by the MEC device 104.

As further shown in FIG. 2, and by reference number 270, the user device 102 and/or MEC device 104 may request and/or indicate an update to the split processing. For example, if the user device 102 gains more available resources, the user device 102 may indicate the same to the MEC device 104 (which may then adjust which processes the user device 102 and/or MEC device 104 are to execute). As another example, if the user device 102 loses available resources, the user device 102 may request the MEC device 104 to execute more processes for an application. If the MEC device 104 loses resources (e.g., due to more user devices using the resources of the MEC device 104), the MEC device 104 may indicate that the user device 102 is to execute one or more processes of the application.

Accordingly, the user device 102 and/or MEC device 104 may dynamically adjust which processes of an application are to be executed by which device according to the characteristics of the user device 102 and/or MEC device 104. As such, the user device 102 and/or MEC device 104 may conserve computing resources of the user device 102, power resources of the user device 102, computing resources of the MEC device 104, and/or network resources of a network of the user device 102 and MEC device 104 by finding an optimal splitting of processes of an application between the user device 102 and the MEC device 104 (e.g., according to the characteristics of the user device 102 and MEC device).

As indicated above, FIG. 2 is provided merely as an example. Other examples are possible and can differ from what was described with regard to FIG. 2. For example, in practice, there may be networks between the devices, additional devices, fewer devices, different devices, or differently arranged devices than those shown in FIG. 2. Additionally, or alternatively, there may be additional calls, fewer calls, or different calls than those shown in FIG. 2.

Figure 3:
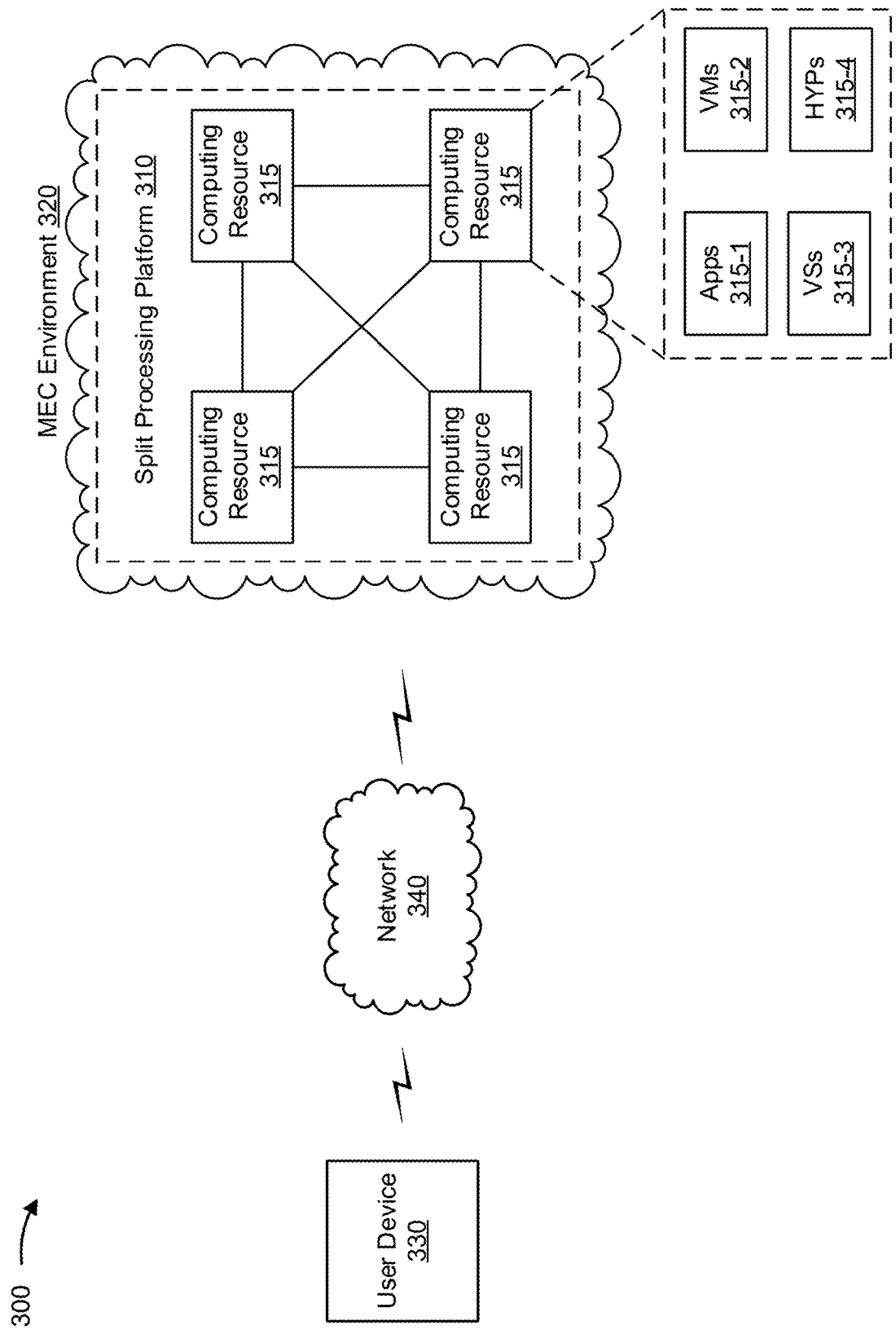
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include a split processing platform 310 hosted on one or more computing resources 315 within a MEC environment 320, a user device 330, and a network 340. Devices of environment 300 may interconnect via wired connections, wireless connections, or a combination of wired and wireless connections.

Split processing platform 310 includes one or more computing resources assigned to perform split processing of an application with user device 330. For example, split processing platform 310 may be a platform implemented by MEC environment 320 that may determine whether split processing of the application can be performed (e.g., based on characteristics of user device 330, based on characteristics of one or more computing resources 315, based characteristics of a communication link via user device 330 and split processing platform 310 (e.g., based on a quality of network 340), and/or based on characteristics of the application and/or processes of the application. In some implementations, split processing platform 310 is implemented by computing resources 315 of MEC environment 320.

Split processing platform 310 may include a server device or a group of server devices. In some implementations, split processing platform 310 may be hosted in MEC environment 320. Notably, while implementations described herein describe split processing platform 310 as being hosted in MEC environment 320 and/or any other type of cloud environment, in some implementations, split processing platform 310 may not be cloud-based or may be partially cloud-based.

MEC environment 320 includes an environment (e.g., a cloud environment) that delivers computing as a service, whereby shared resources, services, etc. may be provided to user device 330. MEC environment 320 may provide processing, software, data access, storage, and/or other services that do not require end-user knowledge of a physical location and configuration of a system and/or a device that delivers the services. MEC environment 320 may be located at or near an edge of a network, such as a cellular communication network. Accordingly, MEC environment 320 may be logically and/or physically located nearer to user device 330 than an orchestrator of a core network associated with MEC environment 320. As shown, MEC environment 320 may include split processing platform 310 and/or computing resources 315.

Computing resource 315 includes one or more personal computers, workstation computers, server devices, or another type of processing and/or communication device. Computing resource 315 may correspond to the MEC device 104 of FIGS. 1A-2. In some implementations, computing resource 315 may host split processing platform 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by user device 330. Application 315-1 may eliminate a need to install and execute the software applications on user device 330. For example, application 315-1 may include software associated with split processing platform 310 and/or any other software capable of being provided via MEC environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program, and may support a single process. In some implementations, virtual machine 315-2 may execute on behalf of a user (e.g., user device 330), and may manage infrastructure of MEC environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems, and may manage the execution of the guest operating systems. Multiple instances of a variety of operating systems may share virtualized hardware resources.

User device 330 includes one or more devices capable of receiving, generating, storing, processing, and/or providing information associated with performing split processing of an application, as described herein. For example, user device 330 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 330 may correspond to the user device 102 of FIGS. 1A-2.

Network 340 includes one or more wired and/or wireless networks. For example, network 340 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
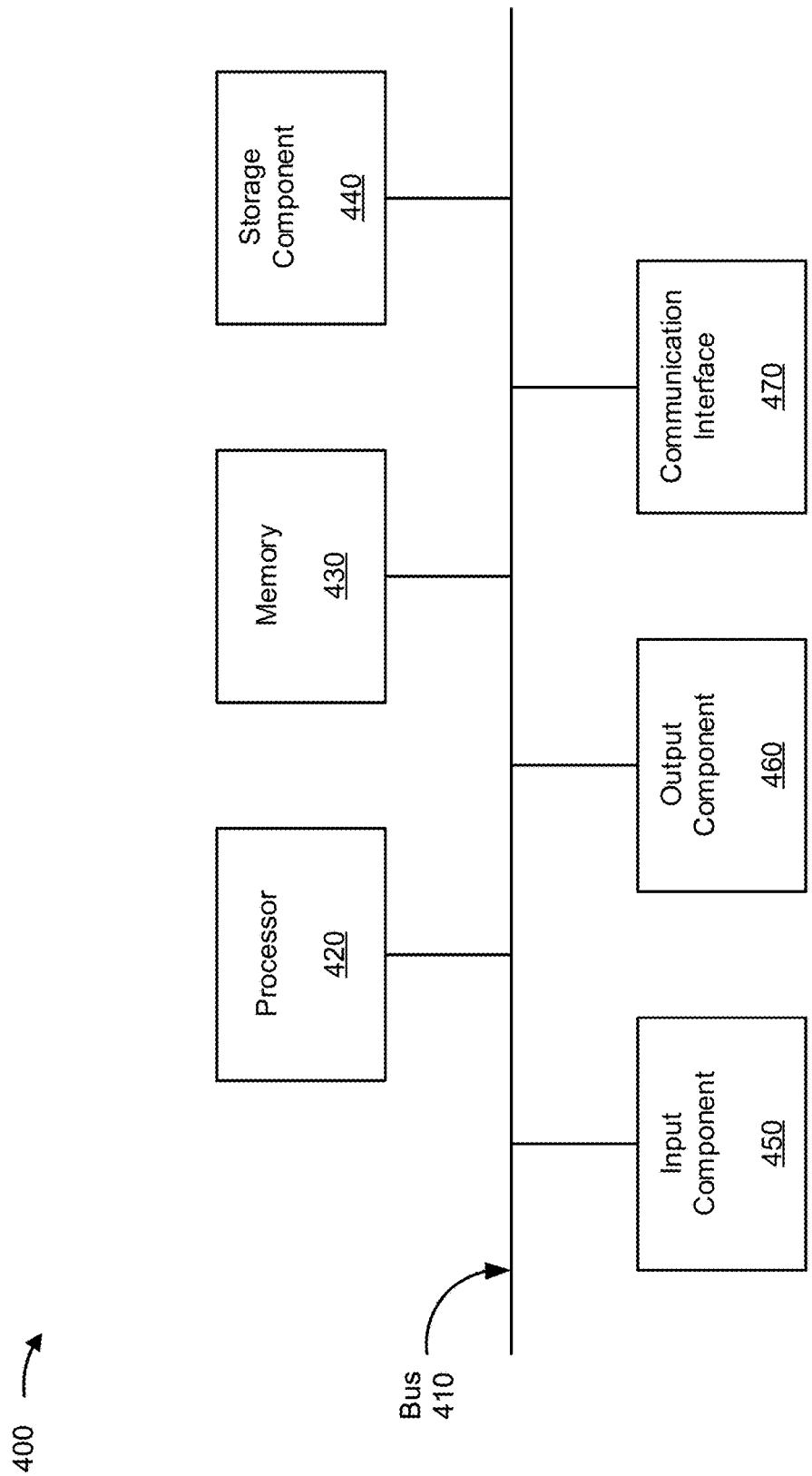
FIG. 4 is a diagram of example components of one or more devices of FIG. 3.

FIG. 4 is a diagram of example components of a device 400. Device 400 may correspond computing resource 315, user device 330, and/or the like. In some implementations computing, resource 315 and/or user device 330 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB)

interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
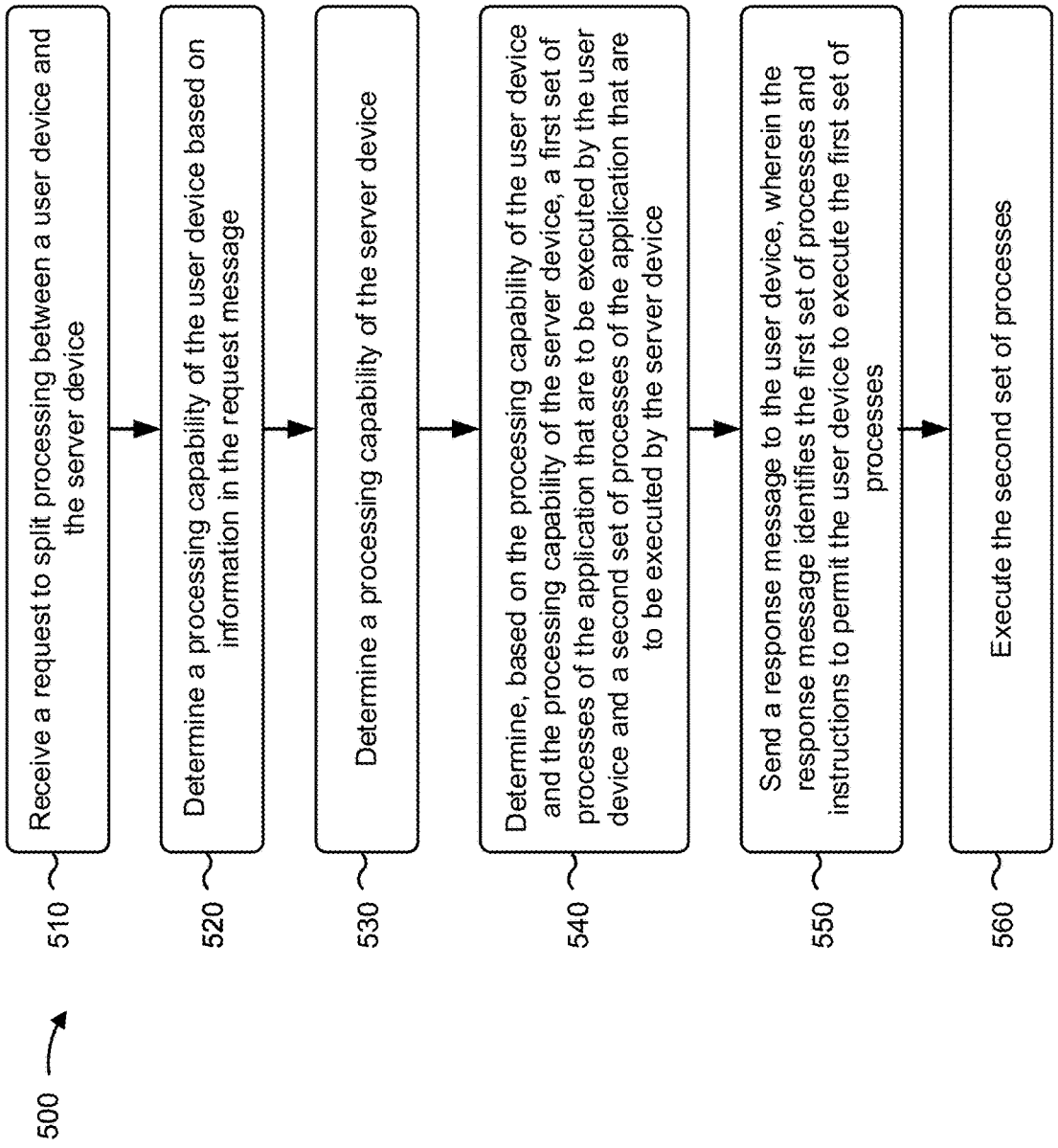
FIG. 5 is a flow chart of an example process associated with a platform to split processing between user device resources and cloud resources.

FIG. 5 is a flow chart of an example process associated with a platform to split processing between user device resources and cloud resources. In some implementations, one or more process blocks of FIG. 5 may be performed by a split processing platform (e.g., split processing platform 310). In some implementations, one or more process blocks of FIG. 5 may be performed by another device or a group of devices separate from or including the split processing platform, such as a user device (e.g., user device 330).

As shown in FIG. 5, process 500 may include receiving a request message to split processing between a user device and the server device, wherein the processing is associated with an application installed on the user device and the server device (block 510). For example, the split processing platform (e.g., using computing resource 315, processor 420, memory 430, input component 450, communication interface 470, and/or the like) may receive a request message to split processing between a user device and a server device, as described above. In some implementations, the processing is associated with an application installed on the user device and the server device. In some implementations, the server device is a mobile edge computing (MEC) server (e.g., a computing resource of the split processing platform) of a cellular communication network.

As further shown in FIG. 5, process 500 may include determining a processing capability of the user device based on information in the request message (block 520). For example, the split processing platform (e.g., using computing resource 315, processor 420, memory 430, and/or the like) may determine the processing capability of the user device based on information in the request message, as described above.

In some implementations, the processing capability of the user device identifies available processing power and/or available memory of the user device and the processing capability of the server device identifies available processing power and/or available memory of the server device. The information in the request may include an identifier of the user device; a model of the user device; a type of the user device; a subscription associated with the user device; a workload of the user device; a quality of a communication link between the user device and the server device; a battery level of the user device; or a power consumption rate of the user device.

As further shown in FIG. 5, process 500 may include determining a processing capability of the server device (block 530). For example, the split processing platform (e.g., using computing resource 315, processor 420, memory 430, and/or the like) may determine the processing capability of the server device, as described above.

In some implementations, the split processing platform may determine the processing capability of the server device based on one or more parameters of the server device. The one or more parameters may include a workload of the server device; a service agreement between the server device and the user device; a service requirement associated with the application; a number of devices in communication with the server device; an amount of available processing power of the server device; or an amount of available memory of the server device.

In some implementations, the split processing platform may detect a change in the processing capability of the server device. Additionally, or alternatively, the split processing platform may receive a message from the user device that identifies a change to the processing capability of the user device. Based on the detected change to the processing capability of the server and/or the message identifying changes to the processing capability of the user device, the split processing platform may determine a third set of processes of the application that are to be executed by the user device and a fourth set of processes of the application that are to be executed by the server device. In such cases, the third set of processes may be different than the first set of processes and the fourth set of processes may be different than the second set of processes. Furthermore, the split processing platform may send a notification message to the user device indicating that the user device is to execute the third set of processes and the split processing platform may execute the fourth set of processes.

As further shown in FIG. 5, process 500 may include determining, based on the processing capability of the user device and the processing capability of the server device, a first set of processes of the application that are to be executed by the user device and a second set of processes of the application that are to be executed by the server device (block 540). For example, the split processing platform (e.g., using computing resource 315, processor 420, memory 430, and/or the like) may determine, based on the processing capability of the user device and the processing capability of the server device, the first set of processes of the application that are to be executed by the user device and the second set of processes of the application that are to be executed by the server device, as described above.

In some implementations, the split processing platform may determine whether the server device is capable of executing a process of the application based on the processing capability of the server device. If the split processing platform determines that the server device is capable of executing the process, the split processing platform may determine the first set of processes and the second set of processes. On the other hand, if the split processing platform determines that the server device is not capable of performing the process, the server device may send a rejection message to the user device, indicating that the server device cannot split the processing of the application between the user device and server device. In some implementations, the split processing platform may determine that the server device is incapable of executing the process of the application after the split processing platform determines the server device is be capable of executing the process of the application. Accordingly, the split processing platform may enable split processing for a time period, and then send the rejection message to stop splitting the processing between the user device and the server device.

In some implementations, the split processing platform may identify processes of the application (which include the first set of processes and the second set of processes). The split processing platform may determine respective characteristics of the processes of the application and select the first set of processes and the second set of processes based on the respective characteristics of the processes. In some implementations, when the split processing platform determines that the server device is not capable of splitting processing with the user device, the split processing platform may determine whether another server device (e.g., of MEC environment 320) is capable of performing split processing. In such cases, the split processing platform may cause the other server device to perform the split processing by sending a request to perform the split processing, providing information associated with the user device, and/or the like.

In some implementations, the split processing platform may determine a quality of a communication link between the user device and the server device. In such cases, the split processing platform may determine whether to enable split processing between the user device and the server device based on the quality of the communication link. In some implementations, the split processing platform determines the quality of the communication link based on a bit rate of the communication link; a packet loss rate of the communication link; a signal-to-noise ratio of the communication link; a signal-to-interference ratio of the communication link; or a signal-to-noise plus interference ratio of the communication link. In some implementations, the split processing platform may reconfigure the communication link between the user device and the server device to enable the user device and the server device to process the application by causing the user device to execute the first set of processes and the server device to execute the second set of processes.

In some implementations, the split processing platform may determine a constraint of the process and determine whether the server device is capable of executing the process based on the constraint being satisfied according to the processing capability of the server device.

As further shown in FIG. 5, process 500 may include sending a response message to the user device, wherein the response message identifies the first set of processes and instructions to permit the user device to execute the first set of processes (block 550). For example, the split processing platform (e.g., using computing resource 315, processor 420, memory 430, output component 460, communication interface 470, and/or the like) may send a response message to the user device, wherein the response message identifies the first set of processes and instructions to permit the user device to execute the first set of processes, as described above.

As further shown in FIG. 5, process 500 may include executing the second set of processes (block 560). For example, the split processing platform (e.g., using computing resource 315, processor 420, memory 430, input component 450, output component 460, communication interface 470, and/or the like) may execute the second set of processes, as described above.

In some implementations, the split processing platform may allocate resources of the server device to execute the second set of processes and cause the resources of the server device to execute the second set of processes.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a server device, a request to split processing between a user device and the server device,
      wherein the processing is associated with an application installed on the user device and the server device;
   determining, by the server device, a processing capability of the user device based on information in the request;
   determining, by the server device, a processing capability of the server device;
   identifying, by the server device, a service agreement that identifies a subscription status associated with the user device;
   determining, by the server device and based on the processing capability of the user device, the processing capability of the server device, and the subscription status identified by the service agreement, a first set of processes of the application that are to be executed by the user device and a second set of processes of the application that are to be executed by the server device,
      wherein the request to split processing is authorized based on the subscription status associated with the user device, and
      wherein a percentage of the second set of processes of the application is determined based on the subscription status associated with the user device;
   sending, by the server device, a response to the user device,
      wherein the response identifies the first set of processes and instructions to permit the user device to execute the first set of processes; and
   executing, by the server device, the second set of processes.

2. The method of claim 1, further comprising:
   detecting a change in the processing capability of the server device;
   based on detecting the change in the processing capability of the server device, determining a third set of processes of the application that are to be executed by the user device and a fourth set of processes that are to be executed by the server device,
      wherein the first set of processes is different from the third set of processes and the second set of processes is different from the fourth set of processes;
   sending a notification message to the user device indicating that the user device is to execute the third set of processes; and
   executing the fourth set of processes.

3. The method of claim 1, further comprising:
   receiving, by the server device, a message from the user device,
      wherein the message identifies a change to the processing capability of the user device;
   based on receiving the message, determining a third set of processes of the application that are to be executed by the user device and a fourth set of processes that are to be executed by the server device,
      wherein the first set of processes is different from the third set of processes and the second set of processes is different from the fourth set of processes;
   sending a notification message to the user device indicating that the user device is to execute the third set of processes; and
   executing the fourth set of processes.

4. The method of claim 1, wherein the processing capability of the user device identifies available processing power and/or available memory of the user device and the processing capability of the server device identifies available processing power and/or available memory of the server device.

5. The method of claim 1, wherein the information includes at least one of:
   an identifier of the user device;
   a model of the user device;
   a type of the user device;
   a subscription associated with the user device;
   a workload of the user device;
   a quality of a communication link between the user device and the server device;
   a battery level of the user device; or
   a power consumption rate of the user device.

6. The method of claim 1, further comprising:
   identifying processes of the application,
      wherein the processes of the application include the first set of processes and the second set of processes;
   determining respective characteristics of the processes of the application; and
   selecting the first set of processes and the second set of processes based on the respective characteristics of the processes.

7. The method of claim 1, wherein the server device comprises a multi-access edge computing (MEC) server of a wireless communication network.

8. A server device, comprising:
   one or more memories; and
   one or more processors, communicatively coupled to the one or more memories, to:
      receive, from a user device, a request message to split processing of an application between the user device and the server device;
      determine a processing capability of the server device;
      identify a service agreement that identifies a subscription status associated with the user;
      determine whether the server device is capable of executing a process of the application based on the processing capability of the server device and based on the subscription status identified by the service agreement,
         wherein the request to split processing is authorized based on the subscription status associated with the user device;
      when the server device is determined to be capable of executing the process of the application:
         send an acceptance message to the user device,
            wherein the acceptance message identifies a first set of processes of the application and includes instructions to permit the user device to execute the first set of processes; and
         execute a second set of processes of the application substantially simultaneously with the user device executing the first set of processes of the application, wherein a percentage of the second set of processes of the application is determined based on the subscription status associated with the user device, and
wherein the second set of processes of the application include the process of the application.

9. The server device of claim 8, wherein the one or more processors, when the server device is determined to be incapable of executing the process of the application, are to:
send a rejection message to the user device,
wherein the rejection message indicates that the server device cannot split the processing of the application between the user device and the server device.

10. The server device of claim 9, wherein the one or more processors are to:
send the rejection message after the acceptance message based on determining that the server device is incapable of executing the process of the application after previously determining that the server device was capable of executing the process of the application.

11. The server device of claim 9, wherein the one or more processors, when the server device is determined to be incapable of executing the process of the application, are to:
cause another server device to perform split processing of the application with the user device,
wherein the other server device and the server device are associated with a same multi-access edge computing (MEC) environment.

12. The server device of claim 8, wherein the one or more processors, are further to:
determine a quality of a communication link between the user device and the server device,
wherein the one or more processors, when determining whether the server device is capable of executing the process of the application, are to:
determine whether the server device is capable of executing the process of the application based on the quality of the communication link.

13. The server device of claim 8, wherein the one or more processors, are further to:
determine a constraint of the process; and
determine that the server device is capable of executing the process based on the constraint being satisfied according to the processing capability of the server device.

14. The server device of claim 8, wherein the one or more processors are further to:
determine a processing capability of the user device based on information in the request message; and
determine the first set of processes and the second set of processes based on the processing capability of the user device and the processing capability of the server device.

15. A non-transitory computer-readable medium storing instructions, the instructions comprising:
one or more instructions that, when executed by one or more processors, cause the one or more processors to:
receive a request message to split processing between a user device and a server device,
wherein the processing is associated with an application installed on the user device and the server device;
determine a quality of a communication link between the user device and the server device;
determine a processing capability of the user device based on information in the request message;
identify a service agreement that identifies a subscription status associated with the user device;
determine a first set of processes of the application that are to be executed by the user device and a second set of processes of the application that are to be executed by the server device based on the processing capability of the user device, the quality of the communication link, and the subscription status identified by the service agreement,
wherein the request to split processing is authorized based on the subscription status associated with the user device, and
wherein a percentage of the second set of processes of the application is determined based on the subscription status associated with the user device; and
perform an action to permit the user device to execute the first set of processes and the server device to execute the second set of processes.

16. The non-transitory computer-readable medium of claim 15, wherein the quality of the communication link is based on at least one of:
a bit rate of the communication link;
a packet loss rate of the communication link;
a signal-to-noise ratio of the communication link;
a signal-to-interference ratio of the communication link; or
a signal-to-noise plus interference ratio of the communication link.

17. The non-transitory computer-readable medium of claim 15, wherein the one or more instructions further cause the one or more processors to:
determine a processing capability of the server device based on one or more parameters of the server device,
wherein the first set of processes and the second set of processes are determined based on the processing capability of the user device, the quality of the communication link, and the processing capability of the server device.

18. The non-transitory computer-readable medium of claim 17, wherein the one or more parameters of the server device includes at least one of:
a workload of the server device;
a service requirement associated with the application;
a number of devices in communication with the server device;
an amount of available processing power of the server device; or
an amount of available memory of the server device.

19. The non-transitory computer-readable medium of claim 15, wherein the one or more instructions, that cause the one or more processors to perform the action, are to:
reconfigure the communication link between the user device and the server device to enable the user device and the server device to process the application by causing the user device to execute the first set of processes and the server device to execute the second set of processes.

20. The non-transitory computer-readable medium of claim 15, wherein the one or more instructions, that cause the one or more processors to perform the action, are to:
provide instructions to the user device to permit the user device to execute the first set of processes;
allocate resources of the server device to execute the second set of processes; and cause the resources of the server device to execute the second set of processes.

\* \* \* \* \*